United States Patent Office 2,906,635
Patented Sept. 29, 1959

2,906,635

MODIFIED ASPHALT

Arthur S. Teot, Midland, Mich., assignor to The Dow Chemical Company, Midland, Mich., a corporation of Delaware No Drawing. Application September 30, 1957
Serial No. 686,822

8 Claims. (Cl. 106—273)

This invention relates to asphalt containing an improved bonding agent. By bonding agent I mean an additive that aids in the establishment of a close bond between the asphalt and the mineral aggregate used therein and prevents or reduces the "stripping" action of water whereby the asphalt-aggregate bond is disrupted.

Many asphalt bonding agents have been proposed or used in the art, though none has been found entirely satisfactory. The most common deficiencies are (1) thermal instability of the modified asphalt, resulting in loss of effectiveness of the bonding agent when the asphalt composition is maintained at working temperatures (225–300° F.) for long periods of time, as is commonly done in the industry; (2) agents that are effective with acidic rock aggregates are frequently ineffective with basic rock and vice versa; and (3) agents that are effective in promoting the bonding of aggregates are frequently ineffective in controlling the stripping action of water, with the result that the bond fails upon prolonged exposure to water.

According to the invention, a modified asphalt that meets all the usual service requirements, that readily bonds to either acidic or basic mineral aggregate, that forms and maintains such bonds in the presence of water, and that retains its effectiveness when heated in asphalt for prolonged periods at the usual working temperatures is obtained by incorporating into any of the commercial cut-back asphalts a bonding additive having the formula

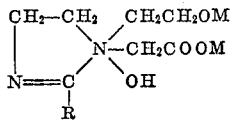

wherein R is an aliphatic hydrocarbon radical containing 13 to 17 carbon atoms and M is an alkali metal of atomic number 11 to 19.

Several compounds corresponding to the above formula are commercially available under the tradename "Miranols" and their preparation is described in U.S. Patent 2,528,378. Those compounds not there described may be prepared by the same general methods there shown.

For the purpose of the invention, it is not necessary that the additive be a single, pure compound. In the synthesis of the compounds the radical

is derived from a long-chain fatty acid, and a mixture of acids may well be used, especially since mixtures of fatty acids are much less expensive than single, pure acids. Thus, the mixtures of acids obtained by splitting natural fats and glyceride oils, such as lard, tallow, cottonseed oil, corn oil, peanut oil, palm oil, soybean oil, linseed oil and similar glycerides, may be used without further purification or separation.

In practicing the invention, the additive may be combined with the asphalt and aggregate in any manner. It may be stirred into the hot asphalt before or after the aggregate is added, or it may be applied to the aggregate before the latter is mixed with the asphalt. The amount required is quite small, a marked beneficial effect being obtained by use of as little as 0.1% by weight, based on the asphalt used. On the other hand, little additional effect is obtained by use of amounts in excess of about 3%. The preferred amount for most purposes is about 0.3 to 1%.

The effectiveness of the asphalt additives of the invention in promoting and retaining asphalt-aggregate bonding in the presence of water is illustrated by the following experiments.

GENERAL PROCEDURE

Six grams of cut-back asphalt containing 75% asphalt and 25% kerosene-type thinner, was mixed with 0.045 g. of the additive to be tested (1% additive, based on asphalt). Thirty grams of crushed aggregate (¼" to ¾" size) was weighed into a 4 oz. bottle containing 2 oz. of water. The modified asphalt was added to the jar so that it floated on the water. The jar was then capped and shaken vigorously for one minute. The water was then poured off and the aggregate transferred to a Petri dish filled with water, the excess asphalt being left behind. The percentage of the surface of the aggregate that was coated with asphalt was estimated immediately and again after 24 hr. Two typical crushed rock aggregates were tested: Massachusetts rhyolite, an acidic stone, and Ohio dolomite, a basic stone. The results are shown in the following table.

Table I.—Effectiveness of additives

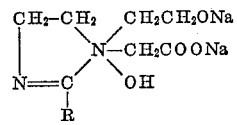

| Additive used R | Percentage of aggregate coated with asphalt | | | |
|---|---|---|---|---|
| | Rhyolite | | Dolomite | |
| | 0 hr. | 24 hr. | 0 hr. | 24 hr. |
| No Additive | 0 | 0 | 0 | 0 |
| n-C$_{11}$H$_{23}$ | 3 | 0 | | |
| n-C$_{13}$H$_{27}$ | 99 | 25 | 98 | 80 |
| n-C$_{17}$H$_{35}$ | 40 | | | |

The type of asphalt used is of no particular significance since substantially similar results are obtained with any of the common commercial types.

The effect of concentration of additive in the asphalt is illustrated by the data in the following table. The tests were made in the same manner as those recorded in Table I except that the concentration of additive was varied. The additive was that in which R=C$_{13}$H$_{27}$.

Table II.—Effect of concentration of additive

| Concentration of additive | Percent of rock coated | | | |
|---|---|---|---|---|
| | Rhyolite | | Dolomite | |
| | 0 hr. | 24 hr. | 0 hr. | 24 hr. |
| 1.0% | 99 | 25 | 98 | 80 |
| 0.5% | 85 | 10 | 98 | 45 |
| 0.25% | 55 | 2 | 70 | 5 |

Additives of the above type wherein R contains 15 carbon atoms are intermediate in activity between those containing 13 and 17 carbon atoms. Likewise, those containing an even number of carbon atoms are intermediate between the adjacent members containing an odd number of carbon atoms.

Unsaturation in the hydrocarbon radical R appreciably improves the activity of the additives of the invention. Thus, additives derived from oleic acid ($R=C_{17}H_{33}$) are somewhat more effective than are those derived from stearic acid ($R=C_{17}H_{35}$). Likewise, those derived from multiple-unsaturated acids, such as those of soybean or linseed oil, are more active than those derived from the acids of more saturated glycerides such as tallow, coconut oil or palm oil. Tall oil fatty acids, being abundant, inexpensive and predominantly unsaturated, constitute a preferred raw material for the manufacture of my additives.

The potassium salts of the additives may be used instead of the sodium salts but they are more expensive and have no compensating advantage.

I claim:

1. A composition comprising asphalt and about 0.1 to 3%, by weight, based on the asphalt, of a compound having the formula

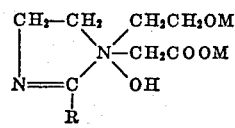

wherein R is an aliphatic hydrocarbon radical containing 13 to 17 carbon atoms and M is an alkali metal of atomic number 11 to 19.

2. A composition as defined in claim 1 wherein the alkali metal is sodium.

3. A composition as defined in claim 1 wherein R is a normal, saturated aliphatic hydrocarbon radical.

4. A composition as defined in claim 3 wherein R is n-$C_{13}H_{27}$.

5. A composition as defined in claim 3 wherein R is n-$C_{15}H_{31}$.

6. A composition as defined in claim 3 wherein R is n-$C_{17}H_{35}$.

7. A composition as defined in claim 3 wherein R is the hydrocarbon radical of the fatty acids of tall oil.

8. A process for improving the adhesion of asphalt to mineral aggregate comprising incorporating into the asphalt about 0.1 to 3% by weight, based on the asphalt, of a compound having the formula

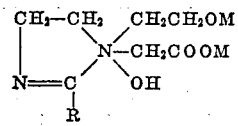

wherein R is an aliphatic hydrocarbon radical containing 13 to 17 carbon atoms and M is an alkali metal of atomic number 11 to 19.

References Cited in the file of this patent

UNITED STATES PATENTS

| | | |
|---|---|---|
| 2,361,488 | Mikeska | Oct. 31, 1944 |
| 2,468,163 | Blair et al. | Apr. 26, 1949 |
| 2,528,378 | Mannheimer et al. | Oct. 31, 1950 |
| 2,766,132 | Blair et al. | Oct. 9, 1956 |